United States Patent [19]
Roth

[11] Patent Number: 5,339,907
[45] Date of Patent: Aug. 23, 1994

[54] DEVICE FOR CONNECTING AN AGRICULTURAL IMPLEMENT TO A TRACTOR

[75] Inventor: Andreas Roth, Neunkirchen-Seelscheid, Fed. Rep. of Germany

[73] Assignee: Jean Walterscheid GmbH, Lohmar, Fed. Rep. of Germany

[21] Appl. No.: 974,715

[22] Filed: Nov. 12, 1992

[51] Int. Cl.⁵ .................... A01B 59/00; A01B 33/00
[52] U.S. Cl. .................... 172/678; 172/107; 172/125; 172/677
[58] Field of Search .............. 172/107, 125, 677, 678

[56] References Cited

U.S. PATENT DOCUMENTS

| | | | |
|---|---|---|---|
| 3,173,709 | 3/1965 | Halverson | 172/677 |
| 4,058,170 | 11/1977 | Ankenman et al. | |
| 4,147,376 | 4/1979 | Slazas | 172/678 |
| 4,384,444 | 5/1983 | Rossier | 172/678 |
| 4,609,049 | 9/1986 | Migdel | 172/107 |

FOREIGN PATENT DOCUMENTS 0027295 4/1981 European Pat. Off. .
2323307 8/1976 France .

*Primary Examiner*—Clifford D. Crowder
*Assistant Examiner*—Bibhu Mohanty
*Attorney, Agent, or Firm*—Harness, Dickey & Pierce

[57] ABSTRACT

A device for connecting an agricultural implement to a tractor, towing it and driving it, via a power take-off shaft, has a double drive (8) which includes two angle drives (15, 16) which are arranged one above the other and which are pivotable relative to one another via a bearing around a first axis. The double drive (8) is associated with a holding bracket (9) and with a support (36) supported thereon via springs. The support (36) has a bearing journal via which is connected to a transverse bar (7) so as to be pivotable around an axis. The transverse bar (7) serves to connect the implement to the catching hook of the lower steering arms (3) of the tractor (1). These permit a pivot movement around the axis. The support (36) ensures improved conditions when accommodating forces in the case of impacts.

7 Claims, 4 Drawing Sheets

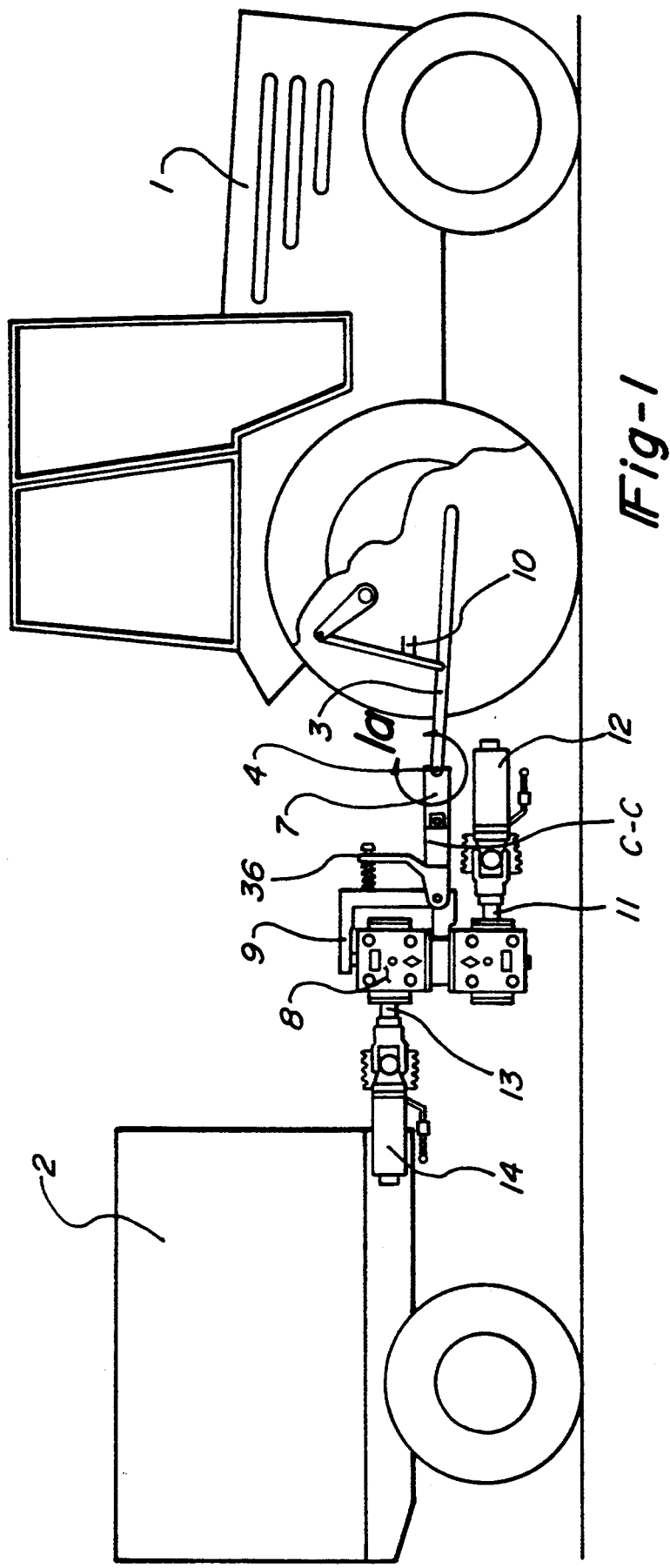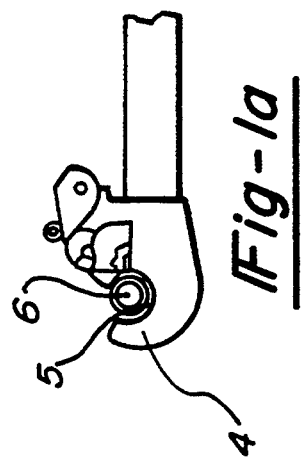
Fig-1
Fig-1a

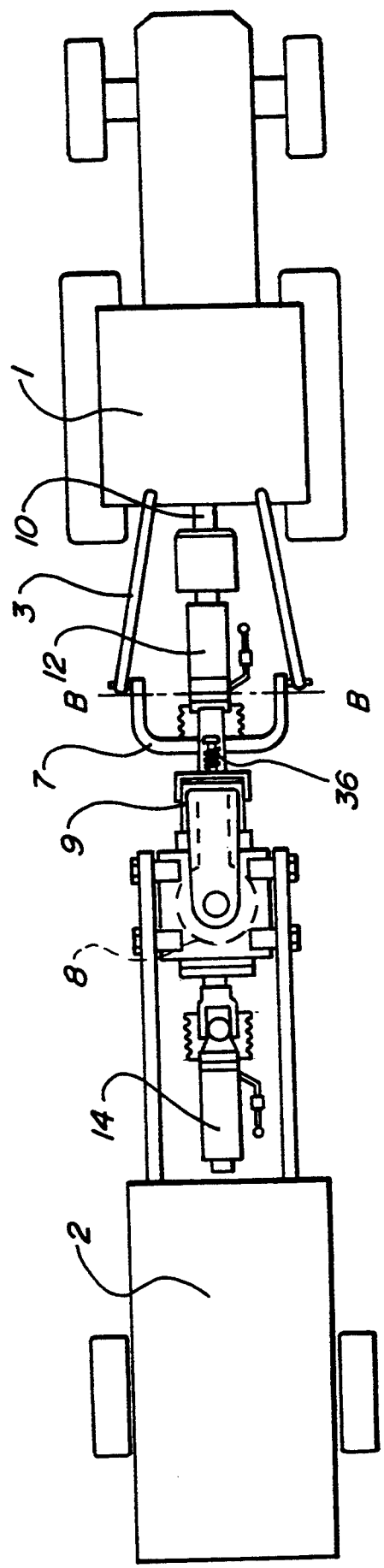

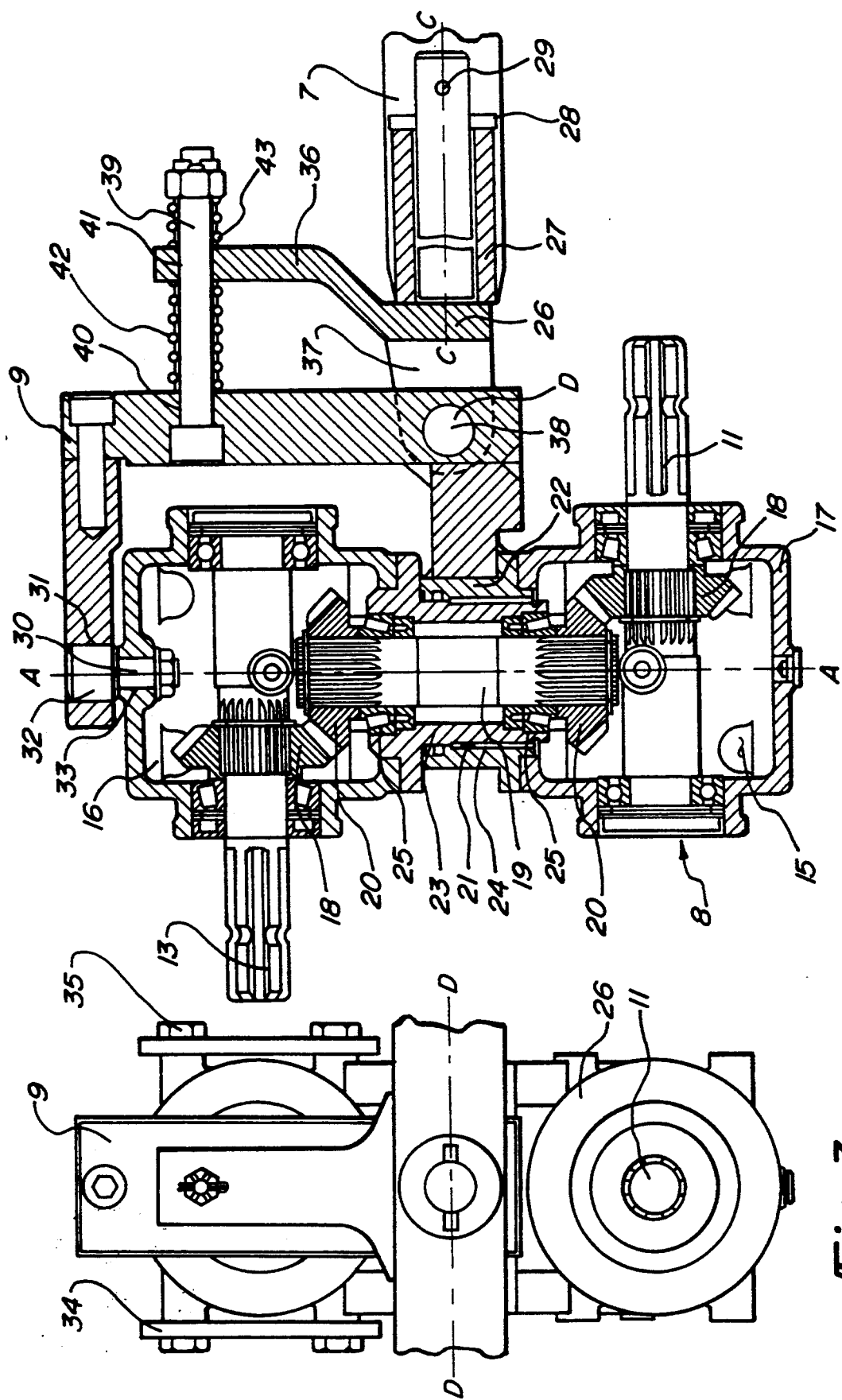

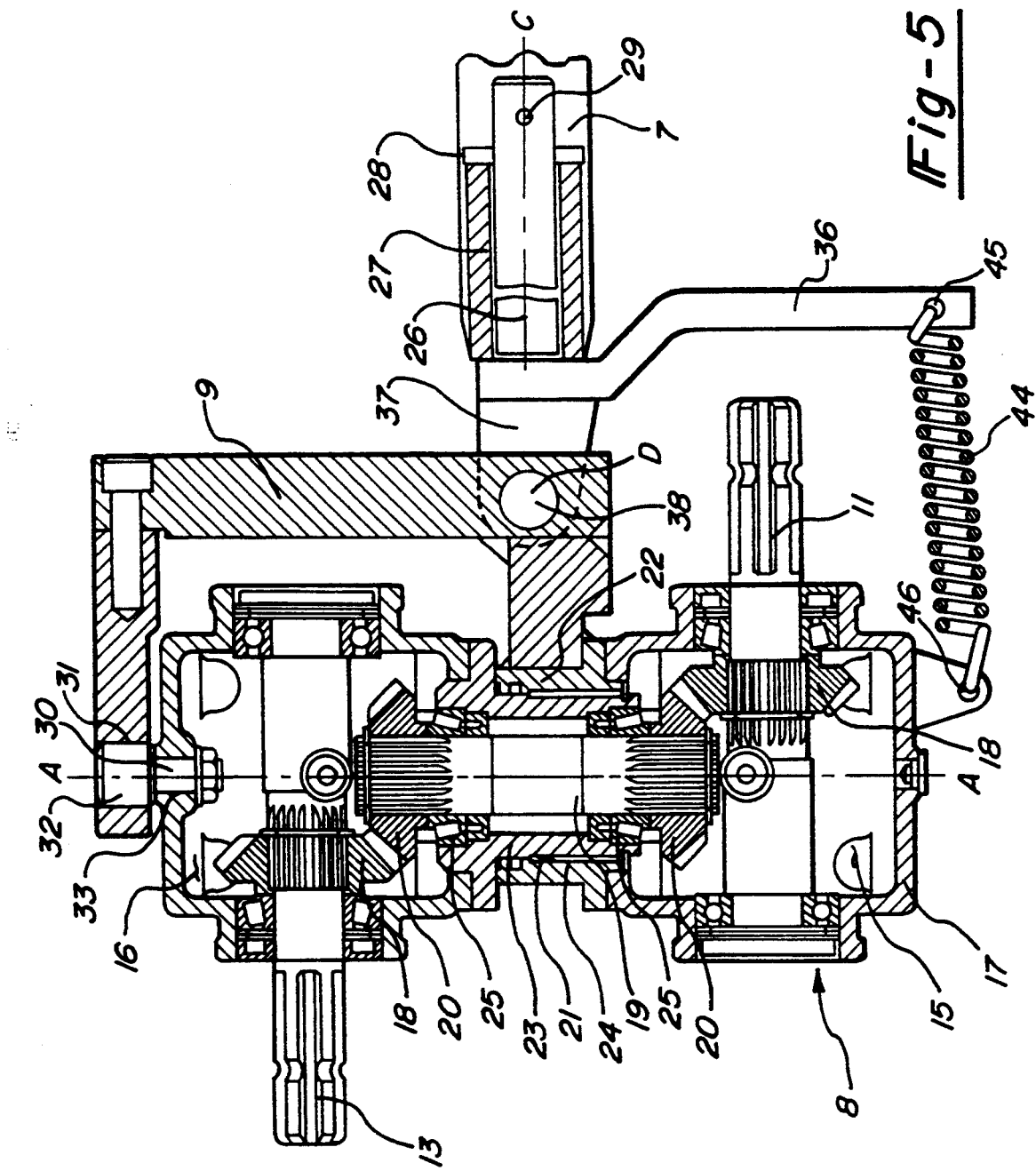

DEVICE FOR CONNECTING AN AGRICULTURAL IMPLEMENT TO A TRACTOR

BACKGROUND OF THE INVENTION

The invention relates to a device for connecting an agricultural implement to a tractor. Also, the device drives, via a power take-off shaft, the agricultural implement. The device includes a double drive with two angle drives arranged one above the other. The drives are pivotable relative to one another, via a bearing, around a first axis and are rotationally connected to one another. One angle drive includes an input journal connected with the power take-off shaft of the tractor, via a driveshaft. The other angle drive includes an output end arranged parallel to the take-off shaft to pass on the rotational movement to the implement. A transverse bar, to which the double drive is attached, serves to pivotably connect the double drive to the lower steering arms of the tractor around a second axis, which intersects the first axis at right angles. The device also includes means for connecting the double drive to the implement and means for enabling the implement to pivot around a third axis, which intersects each of the two other axes.

EP 0 027 295 B1, published May 29, 1985, discloses a pivotable connection around a third axis which is intended to permit pivoted movement of the attached implement, in the field, substantially around an axis which extends parallel to the longitudinal axis of the tractor. The input journal of the double drive constitutes the pivot axis. When driving off or even on the road, the implement attaching means is subject to impacts resulting from uneven surface conditions. Thus, the bearings are subjected to high loads. The impacts are introduced into the bearing of the bevel gear connected to the input journal without being filtered or dampened.

SUMMARY OF THE INVENTION

It is an object of the invention to provide an attachment system which includes a double drive for transmitting torque and where the rotating drive parts are largely kept free of impacts resulting from driving the implement and tractor.

In accordance with the invention, the double drive is connected to the transverse bar. The drive is pivotable to a limited extent against the force of a spring around the spring axis which intersects the first axis at a distance at right angles.

An advantage of this design is that impacts resulting from the movements of the implement/tractor combination are dampened before they are passed onto the drive components.

In a further embodiment, for establishing the connection with the transverse bar, a support exists which is connected to one of the components of the double drive. Thus, the device is pivotable to a limited extent around the spring axis, while being supported relative to the component, via a spring.

Preferably, the transverse bar is arranged on one side of the support and the spring on the other side of the support. The springs are preferably tension or pressure springs. These may be designed as helical or plate springs, as resilient blocks made of rubber or plastics or as leaf springs.

To be able to adjust the implement relative to the tractor additionally around a third axis, the support is connected to the transverse bar. This enables pivotal movement around a third axis which intersects the spring axis at right angles.

According to a first variant, the support may be connected directly to one of the housings of one of the two angle drives. Alternatively, the support is connected to the double drive, with a holding bracket connected therebetween. Thus, at least one of the two angle drives is pivotable relative to the holding bracket around the first axis.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are diagrammatically illustrated in the drawing wherein:

FIG. 1 is a side view of a tractor and implement connected via a device in accordance with the invention.

FIG. 1a is an enlarged view of circle 1a of FIG. 1.

FIG. 2 is a plan view of to FIG. 1.

FIG. 3 is a side view of the double drive viewed in the direction of the support.

FIG. 4 is a sectional side view of the double drive.

FIG. 5 is a view similar to that shown in FIG. 4 with a modified support.

DETAILED DESCRIPTION OF THE PREFERRED EMBODIMENTS

FIGS. 1 and 2 illustrate the implement 2 attached to the tractor 1. The implement 2 is attached to the lower steering arms 3 of the tractor. The implement 2 is associated with a double drive 8. The drive 8 is coupled with a transverse bar 7. The bar 7 includes laterally extending journals 6 with balls which constitute centering elements 5. The balls 5 are centered in the catching hooks 4 of the lower steering arms 3 of the tractor 1. The balls enable the transverse bar 7 to pivot or rotate around an axis B—B (see FIG. 2) which extends transversely relative to the longitudinal axis of the tractor 1.

Furthermore, it can be seen that the rotational movement is transmitted from the power take-off shaft 10 of the tractor 1, via a driveshaft 12, to the driving journal 11 of the double drive 8. The double drive 8 includes an output journal 13 which drives the implement 2 via a shaft 14. The double drive 8 is connected to the transverse bar 7 so as to be pivotable around the axis C—C. The connection is effected via a holding bracket 9 and a support 36 attached in a spring-suspended and pivotable way.

FIGS. 1 and 2 and especially FIG. 4 illustrate the double drive 8 which includes two angle drives 15, 16 which are arranged one above the other. The angle drive 15 is in the lower position. The two angle drives 15, 16 are substantially identical and connected to one another via a bearing 21.

Each angle drive 15, 16 includes a housing 17. For the angle drive 15, the drive input is the input journal 11 driven via the power take-off shaft 10 of the tractor 1. The input journal 11 is supported in the housing 17 via bearings. The journal 11 carries a bevel gear 18 which engages the second bevel gear 20. The second bevel gear 20 is located on an intermediate shaft 19. The shaft 19, at its other end, carries a further intermediate bevel gear 20, which engages the bevel gear 18. The gear 18 forms part of the second angle drive 16 and is associated with the output journal 13.

The bearing 21 includes an outer bearing element 22 which is partly sleeve-like. The element 22, towards the housing 17 of the angle drive 15, is flange-like and is firmly connected to the housing 17. In the bore of the outer bearing element 22 there is received a bearing bushing 24. The bushing 24 has advantageous friction characteristics and rotatably holds the inner sleeve-like bearing element 23, which is a flange. The inner bearing element 23 is firmly connected to the housing 17 of the second angle drive 16. The intermediate shaft 19 is rotatably received in the inner bearing element 23 via tapered roller bearings 25.

The housing 17 of the upper angle drive 16 includes connecting bores which serve to fix the housing 17 to the to be connected implement. For this purpose, the drive housing 17 is enclosed on both sides by brackets 34 associated with the implement 2. Bolts 35 secure the brackets to the housing. The holding bracket 9 is firmly attached to the outer bearing element 22 for example by welding.

The holding bracket 9 is a kind of angle lever whose angled arm comprises a bore 31 whose axis is centered on the first axis A—A. A rolling contact bearing 32 which receives a supporting journal 30 is inserted into the bore 31. The supporting journal 30 is inserted into a bore 33 of the housing 17 of the angle drive 16 and secured to the housing 17 via a threaded journal and nut. A support 36 is attached to the holding bracket 9 so as to be pivotable around the axis D—D. For this purpose, bearing journals 38 laterally project from the holding bracket 9 and pivotably hold the support 36 in bores of its bearing brackets 37. In the case of the embodiment to FIGS. 3 and 4, the free end of the support 36 is provided with a bore 41. A threaded pin 39 passes through a stepped bore in the holding bracket 40 and through the bore 41 of the support 36. Between the outer face of the holding bracket 9 and the support 36, a pressure spring 42, resiliently holding the support 36, is positioned on the pin 39. A further pressure spring 43 is positioned on the end of the pin 39 projecting from the support 36. The pressure spring 43 is supported at its ends by the support 36 and a nut screwed on to the pin 39.

The support 36 carries a bearing journal 26 inserted into a bore of the bearing bushing 27. The bearing bushing 27 forms part of the transverse bar 7. The support 36 and its journal 26 are secured relative to the bearing bushing 27 by a securing disc 28 held by a securing pin 29 passed through the bearing journal 26.

This type of bearing permits the implement 2 to pivot relative to the tractor 1 around an axis C—C extending substantially parallel to the longitudinal axis of the tractor. Any impacts occurring when driving or operating the implement and adversely affecting the attachment system of the implement 2 are accommodated by the sprung support 36.

FIG. 5 shows an alternative way of articulating the support 36 as compared to FIG. 4. Otherwise, the design of the double drive 8 corresponds to that shown in FIGS. 3 and 4. From the pivot axis D—D and the bearing journals 38, the support 36 points downwards. At its free end, the support 36 includes a suspension bore holding a tension spring 44 whose other end passes through a suspension bore 46 in a projection of the housing of the lower angle drive 15.

While the above detailed description describes the preferred embodiment of the present invention, the invention is susceptible to modification, variation, and alteration without deviating from the scope and fair meaning of the subjoined claims.

I claim:

1. A device for connecting an agricultural implement to a tractor comprising:

a double drive having two angle drives arranged one above the other, said drives being pivotable relative to one another via a bearing around a first axis and rotationally connected to one another, at least one angle drive including an input journal for providing a connection with a power take-off shaft of the tractor and the other angle drive including an output end arranged parallel to said input journal for passing on rotational movement to an implement;

a transverse bar coupled with the double drive, said bar pivotably connecting the double drive to lower steering arms of the tractor around a second axis intersecting the first axis at a distance at right angles;

means for connecting the double drive to the implement;

means for enabling an implement to pivot around a third axis intersecting each of the two other axes, said pivot means including a spring position on an axis intersecting the first axis at a distance and at right angles such that the double drive is pivotally connected to the transverse bar so as to be pivotable to a limited extent against the force of the spring.

2. The device according to claim 1, wherein a support is connected to one of the components of the double drive so as to be pivotable to a limited extent around the spring axis.

3. The device according to claim 2, wherein the transverse bar is arranged on one side of the support and the spring on the other side of the support.

4. The device according to claim 1, wherein the spring generating the spring force is designed as a tension or pressure spring.

5. The device according to claim 1, wherein the support is connected to the transverse bar so as to be pivotable around a third axis intersecting the spring axis at right angles.

6. The device according to claim 2, wherein the support is connected to the double drive with a holding bracket connected therebetween, and at least one of the two angle drives being pivotable relative to said holding bracket around the first axis.

7. A drive according to claim 1, wherein the support is connected to a housing of one of the two angle drives of the double drive so as to be pivotable to a limited extent.

* * * * *